Sept. 28, 1943.　　　　H. ORNER　　　　2,330,375
AUTOMATIC POWER TRANSMISSION
Filed May 31, 1941　　　　4 Sheets-Sheet 1

INVENTOR:
Harry Orner

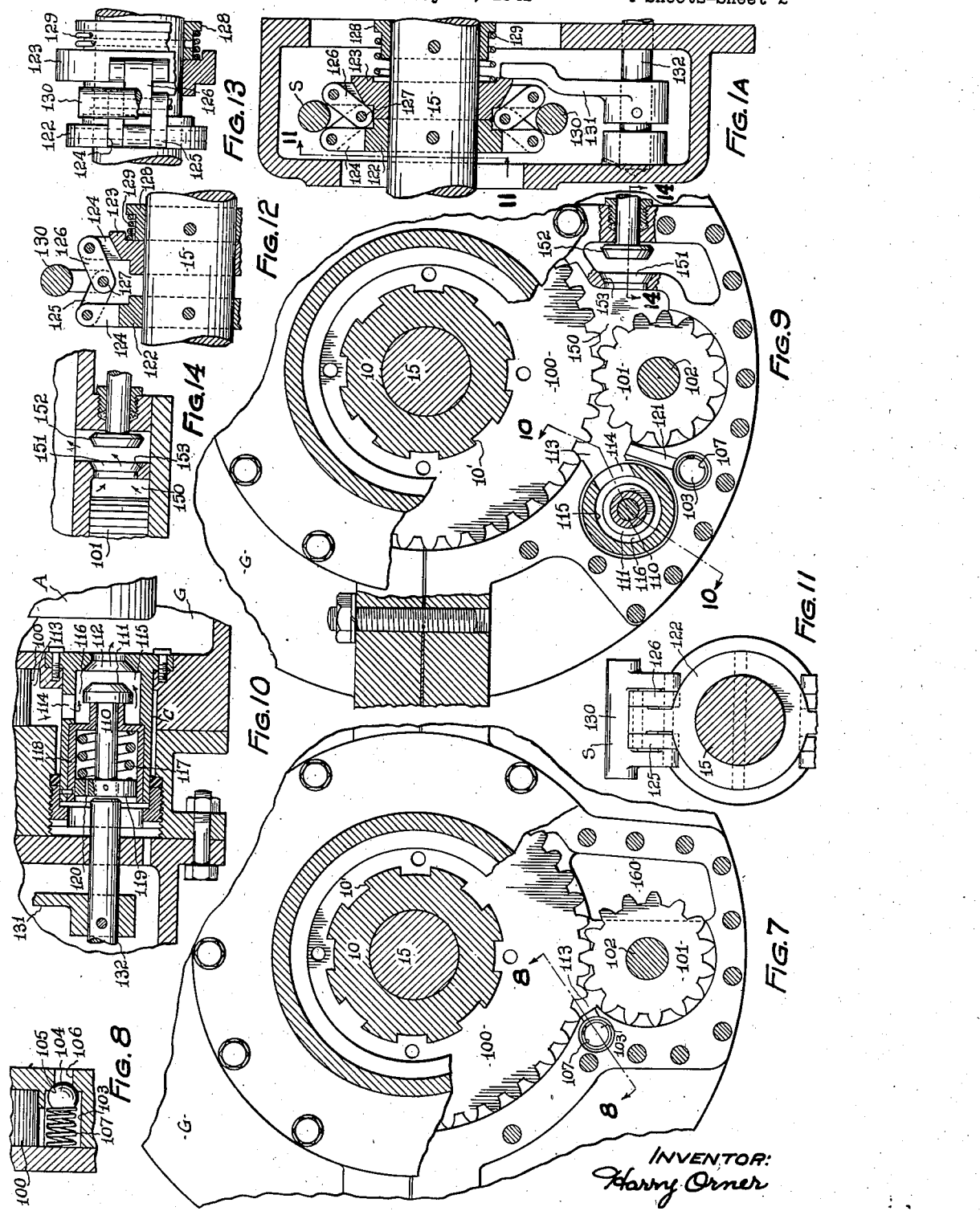

Sept. 28, 1943.  H. ORNER  2,330,375
AUTOMATIC POWER TRANSMISSION
Filed May 31, 1941  4 Sheets-Sheet 3
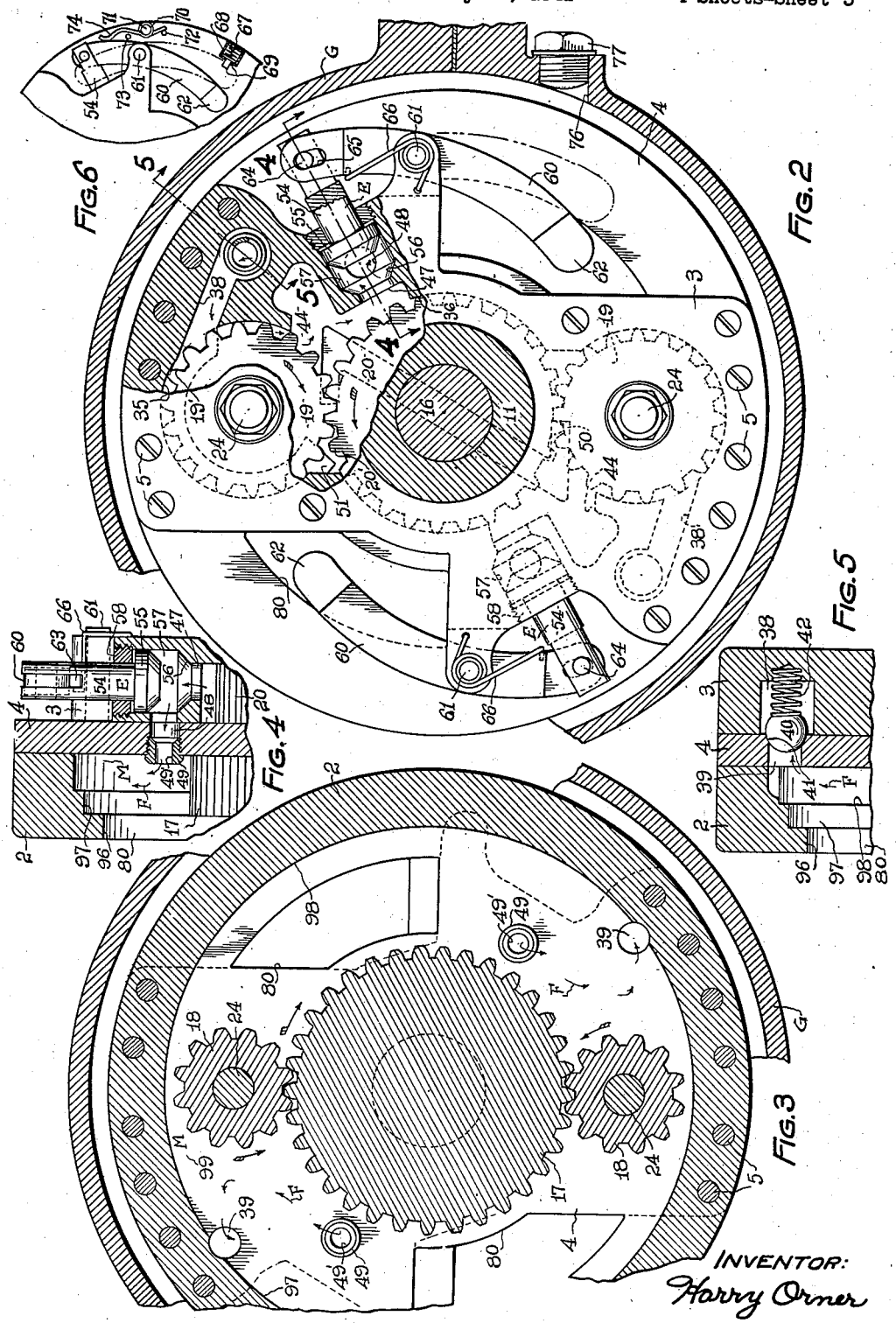
INVENTOR:
Harry Orner

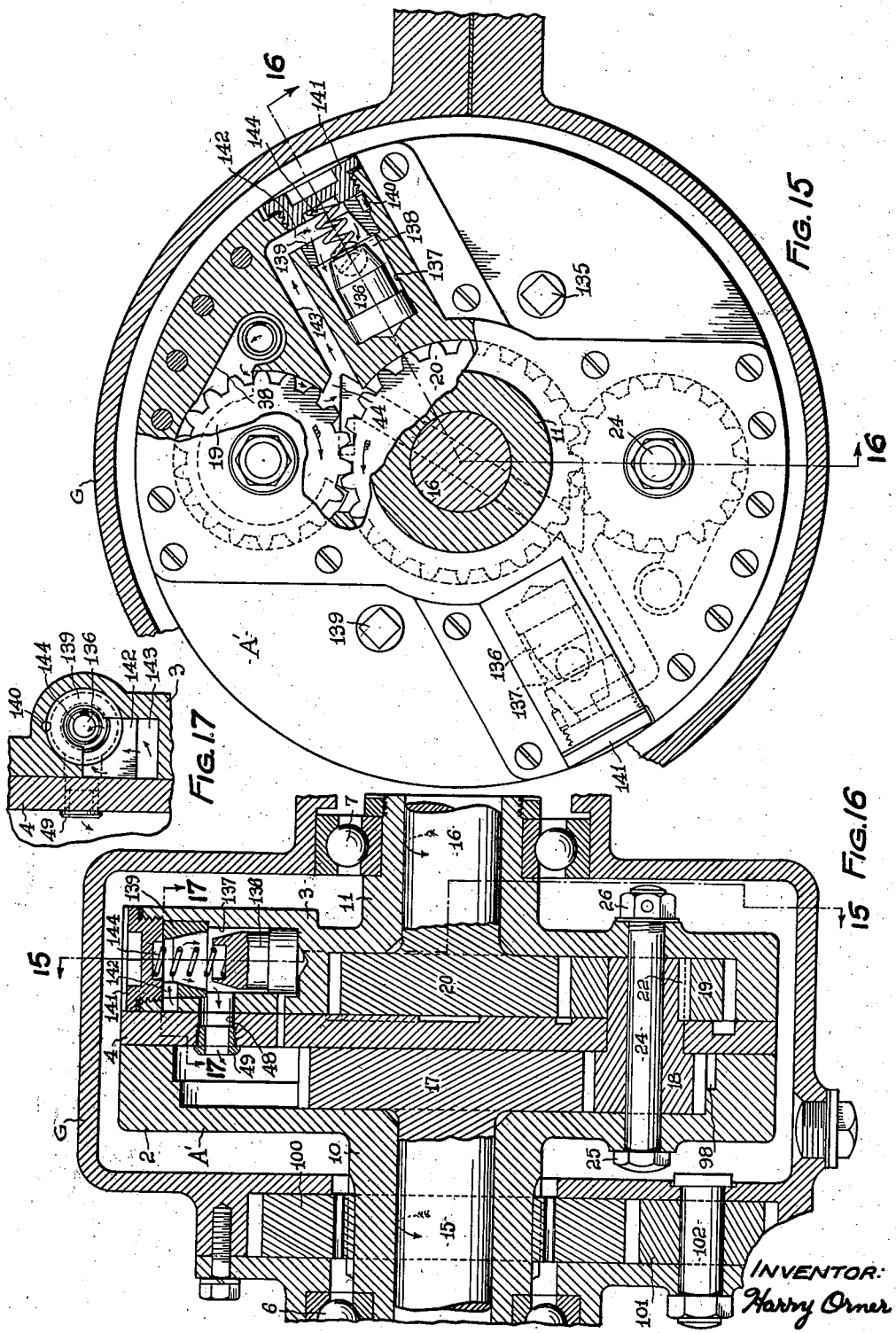

Patented Sept. 28, 1943

2,330,375

UNITED STATES PATENT OFFICE 2,330,375

AUTOMATIC POWER TRANSMISSION

Harry Orner, Cleveland Heights, Ohio

Application May 31, 1941, Serial No. 396,225

25 Claims. (Cl. 74—294)

This invention relates to power transmissions, and particularly to differential gearing transmissions which are connected for power transmission between a power source and a driven load, and which automatically vary the speed ratio of transmission.

The invention is particularly applicable to the driving of loads having considerable inertia, to accelerate or slow down the load by a rotating power source such as an internal combustion engine or electrical motor; and to cases in which it is desirable to have the speed of the load increase or decrease respectively as the torque of the load decreases or increases, below or above a normal torque; and the invention comprises means by which changes in the speed of the load are effected by a transmission, the speed ratio of which varies automatically, in response to changes of speed and to torque of the load.

The subject matter of this application is in part a continuation of the subject matter of my copending application Serial Number 346,172, filed July 18, 1940.

The primary object of my invention is to provide an automatic transmission that will automatically transmit power from a drive shaft to a driven shaft when the drive shaft rotates above a predetermined idling speed to cause the drive shaft to gradually speed up the driven shaft until a predetermined gear ratio is attained and then to automatically decrease the predetermined gear ratio toward or to a one to one ratio, and vice versa, and by which such changes are effected smoothly, automatically and uninterruptedly, without the necessity of shifting gears.

Another object of this invention is to provide a differential gear transmission that will cause a driving shaft to be rotatably connected to a driven shaft at a predetermined velocity of the latter to drive the driven shaft at a predetermined gear ratio.

Another object is to provide a differential gear transmission that will automatically vary the ratio of transmission therethrough between a driving and a driven shaft responsive to changes of the relative torques or speeds of the shafts.

Another object is to provide a differential gear transmission having improved brake means for varying the ratio of transmission, and improved means to variably, automatically apply the brake means.

Another object is to provide a differential gear transmission having improved braking means for varying the ratio of transmission, and wherein such brake means is automatically controlled responsive to the torque-speed relations of the driving and driven shafts.

Another object is to provide a differential transmission having an improved braking means for retarding the gear train as a unit, to cause the driving shaft to drive the driven shaft through an increased gear ratio.

Another object is to provide a mechanism which may be disposed between a source of power and a load to function as a variable speed-ratio power transmission to drive the load; or as a clutch to cushioningly connect the load to the source; or as a brake to cushioningly retard the load.

Other objects of my invention will become apparent from the following detailed description of embodiments thereof illustrated in the accompanying drawings and particularly pointed out in the claims, such disclosed means being merely illustrative of the various mechanical forms in which the principle of the invention may be embodied.

In the accompanying drawings:

Fig. 1A is a continuation of the left-hand side of Fig. 1 and being fastened thereto by bolts as illustrated in part by Fig. 10;

Fig. 2 is a sectional view taken from the plane 2—2 of Fig. 1, with parts broken away to show automatic means therein;

Fig. 3 is a sectional view taken from the plane 3—3 of Fig. 1 showing part of a differential gear train and relative parts;

Fig. 4 is a fragmentary sectional view taken from the plane 4—4 of Fig. 2, illustrating a valve arrangement;

Fig. 5 is a fragmentary sectional view illustrating a one-way valve;

Fig. 6 is a view illustrating a means of loading a valve means at predetermined positions thereof;

Fig. 7 is a sectional view taken from the plane 7—7 of Fig. 1, illustrating a one-directional braking mechanism and relative parts;

Fig. 8 is a fragmentary sectional view taken from the plane 8—8 of Fig. 7 showing a one-way valve for a one-directional braking mechanism.

Fig. 9 is a sectional view taken from the plane 9—9 of Fig. 1, illustrating a one-directional braking mechanism having automatic means to cause a driving shaft to clutch a driven shaft:

Fig. 10 is a fragmentary sectional view taken from the plane 10—10 of Fig. 9 with the parts extended above the plane 9—9 of Fig. 1;

Fig. 11 is a fragmentary sectional view taken from the plane 11—11 of Fig. 1A showing a governor construction of an automatic one-directional brake control;

Fig. 12 is a fragmentary view of the governor construction as shown in Fig. 1A but in a position effected by centrifugal force;

Fig. 13 is a top plan view of Fig. 12;

Fig. 14 is a fragmentary sectional view taken from the plane 14—14 of Fig. 9, illustrating braking means for controlling a rotor housing in direct drive;

Figure 1:
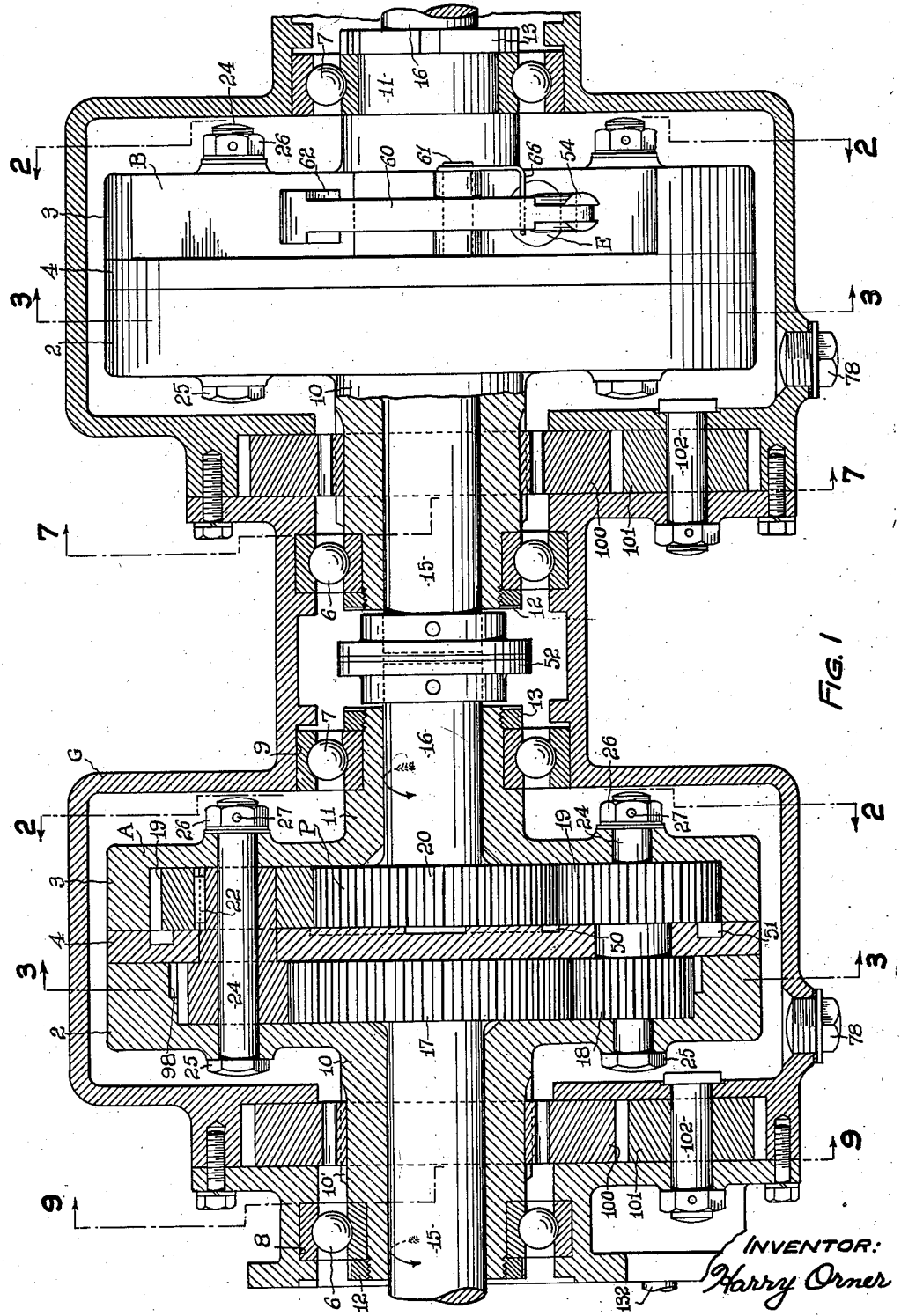
Fig. 1 is a longitudinal, sectional view of an embodiment of my invention and showing two similar units, one in elevation and one in section approximately through a rotational axis thereof.

Figs. 15 to 17, inclusive, illustrate another embodiment of my invention differing from the foregoing in the respect that the rotor housing is self-contained, hermetically enclosed, and has another form of valve construction;

Fig. 15, similar to Fig. 2, is a sectional view taken from the plane 15—15 of Fig. 16 of a transmission unit with parts broken away to show automatic means therein;

Fig. 16 is similar to one unit of the transmission shown in Fig. 1, and is a sectional view taken from plane 16—16 of Fig. 15, showing mechanism therein.

Fig. 17 is a fragmentary sectional view taken from the plane 17—17 of Fig. 16 showing a valve construction.

Referring first to Figs. 1 to 14, inclusive which illustrate one embodiment of my invention, I have shown in Fig. 1, and in section, a rotor housing A, and on a common axis with a similar rotor housing B shown in elevation, both rotatably supported in a general housing G. Rotor housings A and B being similar in structure, it will be sufficient to describe rotor housing A in detail.

The rotor housing A, as illustrated in Figs. 1, 4 and 5 is composed of two sections 2 and 3, and a center plate 4, fastened together by bolts 5, see Figs. 2 and 3, thereby forming a hollow cylindrical rotor housing A, rotatably supported by anti-friction bearings 6 and 7, respectively, mounted in apertures 8 and 9, respectively, of general housing G. Rotor housing sections 2 and 3 have axially extending hubs 10 and 11, respectively, so machined as to fit into the inner races of anti-friction bearings 6 and 7, respectively, and retained therein by threaded collars 12 and 13, respectively, on the threaded ends of the hubs 10 and 11.

Contained within the rotor housing A is a differential gearing P, preferably of the planetary type, and comprising a sun gear 17 in constant mesh with one or more planet gears 18, rotatable on the same axis as, and rigidly connected to, a similar number of planet gears 19. Planet gears 19 are in constant mesh with a second and smaller sun gear 20. Sun gear 17 is integral with or connected to the rotatable driven shaft 15, and the sun gear 20 is integral with or connected to the rotatable drive shaft 16.

Planet gears 18 and 19 are keyed together by keys 22 and rotatably mounted on stationary shaft 24 fixed into rotor housing A, each shaft passing through the rotor housing sections 2 and 3, and through the center plate 4, and having a head 25 on one side, and a nut 26 on the opposite side, and a pin 27 locking the nut 26 to shaft 24.

Rotary motion supplied by a source of power to turn drive shaft 16 in a clockwise direction as viewed from the left end, tends to turn driven shaft 15 in a similar direction, the motion being transmitted by gear train P. In this illustrative instance, because of the difference in pitch diameters of the sun gears 17 and 20, the gear train P transmits motion at a reduced gear ratio to driven shaft 15 from drive shaft 16 and at a proportionally increased torque. With drive shaft 16 rotating in the clockwise direction and driven shaft 15 having a load or torque resistance, if the rotor housing A were free to rotate on bearings 6 and 7, it would rotate in a counter-clockwise direction and this is controlled by a one-way braking mechanism to cause gear train P to turn in the clockwise direction under certain conditions as will now be pointed out.

In Figs. 1, 7 and 8, the preferred one-way braking mechanism is illustrated, consisting of a gear 100 mounted on the hub of the rotor housing A in splines 10' and in constant mesh with an idler gear 101 rotatably mounted on a stationary shaft 102, fixed in housing G. Gears 100—101 are encased in a running fit in housing G in such manner as to form a relatively liquid tight fit to cause a pumping action on a quantity of fluid F disposed in the housing G through holes such as 76, and plugged by threaded plugs 77, as shown in Fig. 2; and similar plugs 78 are provided at the bottom, see Fig. 1, for draining off the liquid when desired. When air is used as a fluid instead of liquid as will be referred to, vents may be provided in housing G, such as holes 76.

The gear 100, in this embodiment is rotated in a clockwise direction viewed from the left, see Fig. 7, as the rotor housing B tends to rotate, and at the side of the gears 100—101 where their teeth move toward each other to intermesh, they project into the area 160 and are here submerged below the level of the liquid F. The gear 100, rotating freely in a clockwise direction, will force the liquid, by the pumping action of the intermeshing teeth, outwardly into the area 160, but with no pumping load braking action to retard gear train 100—101. In instances where this rotation of this gear train 100—101 is of such high relative speed as to cause the fluid to exert a retarding action because of their being submerged in the liquid, the level of the liquid may be maintained below the point of the intermeshing gears 100—101; however as will be pointed out, part of the liquid F at normal operation of this transmission will be carried within the rotor housing A and B and bring the level to the desired position.

On the opposite side of the gears 100—101 is an area 113 into which the meshed gears pump fluid when the gear 100 rotates in a counter-clockwise direction. A one-way valve 103, see Fig. 8, is provided and so constructed as to restrict any flow of liquid F from this area 113 and to open to permit flow of liquid to this area 113. A suitable type comprises a ball 104 seated on a machined surface 105 concentric with a hole 106 in housing G, and a spring 107 abutting the housing G and upon ball 104, and of such tension as to permit free flow of liquid F into the area 113 but to cause the ball 104 to seat on the machined surface 105 conforming to the ball 104 and prevent the flow of liquid from this area 113. The confined liquid will cause a pumping load back pressure or load on the intermeshing teeth of the gear train 100—101 and retard any counter-clockwise rotation of the gear 100 and hence retard or brake any counter-clockwise rotation of the rotor housing B, but permit free clockwise rotation at all times.

In Figs. 9 to 14, inclusive, and Figs. 1 and 1A, another form of the above described one-way braking mechanism is shown, wherein the direction of rotation of the rotor housing A is controlled in both directions of rotation for the following purposes.

If the rotor housing A is permitted to rotate in a counter-clockwise direction of rotation, the drive shaft 16 will rotate without transmitting rotary motion through the gear train P to the driven shaft 15, and hence will effect a neutral or idling condition of the transmission; and if the fluid F is properly throttled at the hole 106, the gear train 100—101 will be retarded causing the drive shaft 16 to smoothly transmit rotary motion thru the gear train P from no-drive to the predetermined gear reduction ratio, analogous in action to the conventional foot clutch in the present day automobile, when shifting from neutral to first. To this end a valve C is provided having a valve body 110 with enlarged valve head 111 having an annular tapered surface to fit into a valve seat 112. The valve seat 112 opens into the housing G, see Fig. 10, and communicates with the area 113, and permits throttling of the fluid F to control the pump load braking action of the gear train 100—101, to control the counter-clockwise rotation of rotor housing A.

The valve body 110 may be controlled in any desirable way, but it is preferable to have valve C controlled automatically responsive to a predetermined speed of the drive shaft 16. For such automatic control a cylindrical chamber 115 is provided concentric with valve head 111 forming an annular space 116 between the valve head 111 and the inner walls of the cylindrical chamber 115, to permit a free flow of the fluid F, as pumped by the gear train 100—101, to pass thru an orifice in the cylindrical chamber 115, thence through the annular space 116 if below a predetermined rate of flow, as governed by the velocity of the drive shaft 16. This permits the rotor housing A to rotate counter-clockwise and hence permits the drive shaft 16 to rotate independently of the driven shaft 15, thereby effecting an idling speed of the shaft 16. However when the drive shaft is speeded up and reaches such velocity as to cause the gear train 100—101 to pump fluid F through the annular space 116 beyond the predetermined idling rate, pressure will be created on the valve head 111 to seat it on the valve seat 112, and so retard the circulation of fluid F, to thereby retard the gear train 100—101. A dash-pot consisting of a cylinder 118 fastened in the cylindrical chamber 115 and a piston 119 fitted therein and attached on the other side of the valve body 110 constitutes a control for the rate of movement of the valve head 111 toward its valve seat 112 by the pressure of the fluid F on the valve head 111, the movement being governed by a hole 120 in the piston 119 to govern the rate of liquid escapement. A spring 117 abutting the piston 119 and the end wall of cylinder 118, is provided to oppose movement of the valve head 111 toward the valve seat 112 and to oppose all pressures on the valve head 111 effected by the pumping fluid F, up to the predetermined pressure by the restricted flow through the annular space 116. The area of the annular space 116 and the tension of the spring 117 are predetermined by design to cause the valve C to seat at a predetermined rate of flow of fluid F as pumped by the gear train 100—101; and dash-pot 118—119 and its escapement at 120 predetermine the rate of throttling of the valve C for smooth clutching of the rotary shafts.

Fluid F pumped by the gear train 100—101 above the predetermined idling rate will move the valve head 111 toward the valve seat 112 at such rate as to throttle the circulating fluid F to cause it to gradually build up a pumping load in the area 113 and gradually retard the pumping gear train 100—101 until the valve C is completely closed and retained closed by the pressure therein. A one-way valve 103, see Fig. 7, as described for rotor housing B is similarly connected to this area 113 by the channel 121, see Fig. 9, and in all conditions in which valve C is closed the one-way valve 103 will function as described for rotor housing B, see Fig. 7.

The valve C, as pointed out, functions only during the transition from neutral or no-drive or idling of the transmission, to the first reduction gear ratio; at all other times it is desirable to have valve C closed or so nearly closed that any pressure in area 113 will be maintained and the following means is therefore provided.

It may be borne in mind that the driven shaft 15 at neutral or no-drive is not rotating, being independent of drive shaft 16; and this is also the condition at which valve C is open. Referring to Fig. 1A, and 11 to 13, inclusive, a governor mechanism S is provided on driven shaft 15, consisting of a collar 122 fastened to the shaft 15, a collar 123 free to move longitudinally on the shaft 15, bosses 124 extending outwardly from the axis on each of the collars to receive links 125 and links 126, on collars 122 and 123 respectively. Links 125 and 126 are fastened together at their other ends by a pin 127 in such manner as to permit relative outward motion of the collar 123 longitudinally on the shaft 15 with respect to stationary collar 122 until it abuts a stop such as a collar 128 fastened to shaft 15, see Figs. 12 and 13. A spring 129 is disposed between collars 123 and 128 with sufficient tension to normally cause collar 123 to be in contact with collar 122, see Fig. 1A. Weights 130 are mounted on pin 127 in such manner as to be effected by centrifugal force upon rotation of the driven shaft 15, the movement of the weights radially outwardly cause the links 125—126 to move collar 123 toward collar 128 overcoming the tension of spring 129. A finger 131 contacting the movable collar 123 is caused to move with it, see Figs. 1A and 10, and moves a shaft 132 fastened thereto, journaled in housing G coaxial with the valve body 110 of the valve C and the piston 119.

When the pumping gears 100—101 are retarded by the pumped load braking action as governed by the throttling of fluid F by valve C, the driven shaft 15 will start to rotate, and the valve C will start to close. When a predetermined speed of the shaft 15 is attained, the valve C will be closed and at this speed of the shaft 15 the weights 130 move out to retain the valve C closed. When the velocity of the driven shaft falls below the predetermined velocity the springs 129 move the collar 123 to contact collar 122 and release the valve C, and the spring 117 of valve C will move the piston 120, the shaft 132 and finger 131 to the original positions to be operated again when it is again desired to couple drive shaft 16 to driven shaft 15 through the planetary gear train P, by again speeding up the shaft 16.

Automatic means is therefore provided as described to change from the no-drive or idling condition of my transmission, to the first gear reduction ratio in a smooth manner responsive to the velocity of the driving shaft 16. Means will now be described to automatically control the change from this first gear reduction ratio of the differential gearing P to direct drive or one to one ratio of transmission by putting a brake load on pinions 18 and 19 to correspondingly cause the gear train P to rotate as a unit. It is desirable for the automatic means to do this responsive to torque and speed differences as between the shaft 15 and shaft 16; and it is preferable to do this so that for an increased load on the load shaft 15, the ratio of transmission will be reduced and the torque correspondingly increased and vice versa. The torque resistance or load on the driven shaft 15 to be overcome, will determine the proper gear reduction ratio to be provided to correspond with the particular machine to be driven and the source of rotary power. In the mechanism to be described, when the torque resistance has been overcome and the load is started and speeded up to the predetermined speed referred to at which it is driven at the reduction speed ratio, the speed ratio of the transmission changes gradually to direct drive or one to one ratio from drive shaft 16 to driven shaft 15. This is accomplished by slowing down and finally stopping the rotation of the planet gears 18 and 19 on their axes thereby causing revolution of the gear axes in unison with the sun gears 17 and 20; and rotary motion of the drive shaft 16 is thereafter transmitted in a direct drive, to driven shaft 15.

The differential gear train P contained within rotor housing A and comprising the sun gear 20 in constant mesh with the plurality of equally spaced planet gears 19 (two planet gears being illustrated see Fig. 2), has a running fit within machined apertures 35 for the planet gears 19 and aperture 36 for the sun gear 20, and enclosed by the center plate 4 which constitutes a transverse aperture wall. This fit is close enough to be liquid tight for liquids such as oil, to be referred to, and permit little or no escape of such fluid between the walls of the apertures the center plate 4 and the enclosed gears. It is, understood that a "fit" in this instance may be either a simple metal to metal fit or may be any of the more compound fits such as are provided by rings or packing (not shown) to suit the conditions for which this invention is intended to be used, as will become apparent.

Referring to Fig. 2, inlet channels 38 are provided, starting from holes 39 in the center plate 4, see Fig. 3, and terminating on the peripheral walls of the apertures 35. In certain circumstances, a one-way valve may be desired in channel 38, see Fig. 5, a suitable type comprising a ball 40 seated on a machined surface 41 concentric with a hole 39, and a spring 42 abutting upon the housing section 3 and ball 40, and of such tension as to permit free flow of fluid F into channels 38 but to cause the ball 40 to seat on the machined surface 41 conforming to the ball 40 and prevent the flow of the fluid out of channels 38.

Teeth 19' on the gear 19 mesh with teeth 20' on the sun gear 20, see Fig. 2. On the side where teeth 19' and 20' move toward each other to intermesh, are pressure chambers 44, these pressure chambers 44 being connected together to equalize pressure therein, and in the instant embodiment this is effected by a diagonal groove in plate 4. Valve arrangements indicated generally at E—E, are each connected by an orifice 47 in rotor housing A to a pressure chamber 44 and an orifice 48 in plate 4, see Figs. 2 and 4, leads from valve E to a hollowed cavity M in rotor housing section 2. Fluid F, indicated by the direction of its flow by arrows, enters the holes 39 in the center plate 4 and passes the ball 40 of the one-way valve D, see Fig. 5, and flows through the channel 38 into the aperture 35 and is carried, by the spaces between the teeth 19' upon rotation of the planet gear 19, to the pressure chamber 44. At this point, teeth 19' intermeshing with teeth 20' of the sun gear 20, cause the teeth to displace the fluid F in the spaces between the teeth, and force it into the pressure chamber 44, causing a rotary gear pumping action to occur on the fluid F and urging the fluid F toward the orifice 47. The orifices 47 and 48 are so designed as to permit free flow of the fluid F through the valve E, when completely open, at the maximum rate of flow caused by the pump action of the gear teeth 19' and 20'. A plug 49 is provided in the outlet orifice 48 having an opening 49' so proportioned as to begin to restrict the flow of fluid F at a velocity just below the maximum rate of flow as determined by the speed of the gear 19 and 20, at which the change to a higher ratio of transmission is to begin. Free unretarded rotation of the planet gears 19 and 20 on their respective axes is therefore permitted until such velocity is reached at which the fluid flow begins to be restricted by the orifices 49' and cause pressure thereby built up in pressure chamber 44, to begin to retard the planet gears 19 on their respective axes and to cause the rotor housing A to start rotating.

The control of the fluid F as described is effected by the valve arrangement E, and this valve construction may be any design to suit any particular application. The valve E in the instant embodiment is shown in Figs. 2 and 4, and comprises a cylindrical valve body 54 with its longitudinal axis lying preferably on a radial line from the axis of the rotor housing A and mounted therein. The inner end of valve body 54 has an enlarged circular valve head 55 with proper taper to fit the valve seat 56. Valve head 55 is concentric with orifice 47 and is interposed between orifices 47 and 48 to control fluid flow therethrough, and is free to move longitudinally in a circular chamber 57, in rotor housing section 3, concentric with valve head 55. The diameter of the chamber 57 conforms to the diameter of the valve head 55 to permit it to move freely outwardly from the valve seat 56 and to permit the flow of fluid through the orifices 47 and 48; and when moved inwardly tends to restrict and ultimately stop the flow of liquid through orifices 47 and 48, causing the liquid to be confined in pressure chamber 44 and hence retard the rotation of gears 19 as explained.

The valves E are operated automatically to open upon a relative increase of load shaft torque and effect a decrease of transmission ratio, and to close and increase the transmission ratio upon a relative decrease of load torque; and the difference between the drive shaft torque and driven shaft torque is balanced in correlation with the difference between the drive shaft speed and the driven shaft speed; and this is accomplished as follows.

The valve body 54 is journaled in a cap 58 closing the chamber 57 and acting as a stop for the outward movement of the valve head 55. The outer end of the valve body 54 is bifurcated to receive one end of a beam member 60 pivoted on a pin 61 in the rotor housing A, and having at its other end a weight 62. A pin 64 passes through the bifurcations of the valve body 54 and through an elongated hole 65 in beam 60 in such manner that motion can be transmitted from beam 60 to valve body 54 and vice versa. A spring 66 coiled on the extended portion of pin 61 is so wound as to have an initial tension on the beam 60 in the direction to retain the valve open.

The valve construction E permits fluid F to be forced by the pumping action of the rotating gears 19—20, from the chamber 44, through orifice 47, into chamber 57, through orifice 48, into the hollow portion M of rotor housing section 2, the fluid passing freely through the orifice 49' of the plug 49 until a predetermined rate of flow of fluid is attained, approaching the maximum flow as governed by the velocity of the driving shaft 16. Beyond such predetermined flow rates restriction of the flow causes a pressure in the chambers 44 and 57 which retards the gears 19 and causes the rotor housing A to start turning at a speed to just cause the weight 62, by centrifugal force, to overcome the initial tension of the spring 66 and permit the valve head 55 to be moved toward the valve seat 56. This causes a further increment of restriction of the flow of fluid through the orifices 47 and 48, and causes a further increment of increase in the pressure in chambers 44 and 57 and causes a further increment of speed of rotor housing A. Pressure in chambers 44 and 57 tends to move the valve head 55 in a counter direction, to tend to increase the flow of fluid F. Hence two counterforces act on the valve E, the centrifugal force of increased velocity acting on the weight end of the beam 60; and the increased fluid pressure in chambers 44 and 57 on the valve end of the beam 60. The weight 62, lever arms of the beam 60, and spring 66, are so designed as to overcome the pressure in chambers 44 and 57 proportionally as the prime mover on driving shaft 16 overcomes the resisting load on the driven shaft 15.

The fluid pressure in chambers 44 and 57 increases as the load on driven shaft 15 increases in relation to the torque of the prime-mover on the driving shaft 16; and decreases as the torque of the prime-mover on driving shaft 16 overcomes the load on the driven shaft 15. Hence as the weight 62 causes the valve E to close in continuous increment steps, the prime-mover on the driving shaft 16 tends to overcome the load on driven shaft 15 in similar continuous increment steps until the valve head 55 is completely seated on valve seat 56 and stops all flow of fluid F and the drive shaft 16 drives the driven shaft 15 in one to one ratio. At any time during operation, if the load is increased on the driven shaft 15 in relation to the torque of the prime-mover on the driving shaft 16, pressure in chambers 44 and 57 increases to unseat or further unseat the valve head 55 to permit fluid flow to relieve the pressure therein and at the same time permitting the gears to rotate, and permitting the driving shaft 16 to drive the driven shaft 15 at an increased gear reduction ratio, to overcome this increased load, and by continuous increment steps, until the valve E is completely closed and the one to one ratio attained.

Similarly if the load on the driven shaft 15 decreases in relation to the torque of the prime-mover on the driving shaft 16, the pressure in chambers 44 and 57 will decrease permitting the valve head 55 to seat by continuous increment steps as the weight 62 overcomes the pressure in chambers 44 and 57 and as the prime-mover by similar continuous increment steps, overcomes the load.

A transmission is therefore provided that starts from an idling speed of driving shaft 16 and automatically causes the driving shaft 16 to become drivingly engaged with the driven shaft 15 in a smooth continuous manner upon increase of velocity of the drive shaft 16; and the driven shaft 15 is speeded up until it is driven at a predetermined gear reduction ratio; and the predetermined gear reduction ratio is then smoothly and continuously decreased automatically, as the driving shaft overcomes the load on the driven shaft, until a one to one ratio is attained; and these conditions reverse automatically to give an increased gear reduction ratio if the load increases relative to the driving torque.

In this transmission as pointed out the torque is balanced against rotary speed in a direct manner to suit the particular application, but in certain instances the torque may not be in such direct relations and the lever beam 60 must be properly loaded at definite points of torque to compensate such variations. Referring to Fig. 6, which is a view showing an example of such loading, a compression spring 67 in a cylinder 68 abuts a member 69 at an initial tension in such manner as to load the lever arm of beam 60 at a predetermined position; or a spring such as 70 may be used, on a pin 71 with one end abutting a pin 72 and the other end 74 extending beyond a stop pin 73 at an initial tension to engage with a lever arm of beam 60 to load the lever arm at a predetermined position relative to the torque value at that instant. Any such springs or similar constructions may be used in one or more places on the beam 60 to give the proper relation of the movement of the beams 60 with the variations of the speed of the prime-mover overcoming the load. In certain instances the weight 62 may be dispensed with and pressure in chambers 44 and 57 may act counter to a spring pressure such as spring 70, to give a desired torque value independently of the velocity transmitted.

The rotor housing rotates counter-clockwise as viewed from the left in Fig. 1, for the neutral or no-drive condition of the transmission, and would tend to pump fluid in chamber 44 and also effect the weight 62 by centrifugal force. The counter-clockwise rotation of rotor housing A takes place at a relatively low velocity since this is the condition at which the prime-mover idles, and restriction 49' therefore permits free flow of the liquid F, because the gears 19—20 rotate at a correspondingly slow speed. The beam 60 may be loaded to remain in ineffective position by the initial tension of spring 66 to keep the valve E open at this relatively slow speed.

It may be desirable to control the clockwise rotation of the rotor housing as viewed from the left, to correspond to the action of the conventional transmission of an automobile when going down hill, wherein the conventional transmission is shifted to a lower speed to act as a brake on the driven wheels by compression in the cylinders of the motor. In the instant embodiment when used as an automobile transmission the braking of the rotor housing A or B or both would cause the transmission of rotary power from the wheels to drive the shaft 16 through the gear train P at an increased gear ratio or overdrive ratio, to overcome the compression in the cylinders of the motor, and so retard the speed of the automobile.

To effect this, instead of the area 160 of Fig. 7, a chamber 150 may be provided, see Figs. 9 and 14, in one or both of the units, having an outlet 151 to permit free flow of fluid F. A valve 152 coacting with a valve seat 153 in the outlet 151 will then control the fluid flow as desired, to control the pump load pressure in chamber 150, to cause a braking of the clockwise rotation of the rotor housing A, to cause the shaft 15 to drive the shaft 16 at an increased gear ratio through the gear train P. Any retarding force on the shaft 16 would retard the rotary shaft 15.

It follows furthermore that the transmission above described may be used as an overdrive transmission. The driven shaft in this case 16 will be driven at an increased speed ratio from the driving shaft 15. Thus if a prime-mover rotated the shaft 15, see Fig. 1, it would transmit rotary motion thru the gear train P to the shaft 16 at an increasing gear ratio upon retarding the clockwise rotation of the rotor-housing A. At normal conditions, the shaft 15 would transmit rotary motion to shaft 16 through rotor housing A at one to one ratio, because of the increased ratio of transmitting rotary power through the differential gear train P. Upon retarding the rotor housing A by such valve means as 151—152, the rotary power would be transmitted thru the increasing gear ratio of the gear train P to cause the shaft 15 to drive the shaft 16 at an increasing speed, and such change would be effected smoothly and with no interruptions.

The above described use of my invention for overdrive can be automatically controlled by using the valve construction C in place of valve means 151—152, to effect such change of overdrive at a definite velocity of the rotary housing A, to effect a smooth continuous transition from one to one ratio to the predetermined increased gear ratio of the gear train P.

As to the general circulation of fluid F in the mechanism described above the fluid F is free to enter the rotor housing A and B between the vertical walls in section 2 and plate 4, through openings 80 as shown in Figs. 2 and 3. A depending wall 96, at the outer circumference of the openings 80 forms a channel 97, U-shaped in cross-section, see Fig. 4, which retains the liquid therein by centrifugal force when the rotor housing A starts to rotate. These channels 97 are connected by a common channel so as to permit the liquid F to distribute itself equally in the channel 97 for maintaining the dynamic balance. In the instant embodiment, the common channel is in the form of an annular under-cut 98, see Figs. 1 and 4, passing just outwardly of the planet gear 18 and connecting channels 97 together by a common conduit path M. The holes 39 of the inlet channels 38 communicate with this conduit path M, see Fig. 5, and are continuously covered by liquid F as the rotor housing starts rotating. The liquid F is caused to flow through holes 39, into inlet channels 38, see Fig. 2, by the pumping action of gear teeth 19' and 20', and to the pressure chamber 44, through the open valve E into the annular path M, in a continuous cycle, to effect complete circulation of liquid F.

The intermeshing teeth 19' and 20' may cause some of the liquid F to be locked in the space between the teeth, and a groove 50, see Fig. 2, in center plate 4, is so placed as to relieve the liquid F into pressure chamber 44. Also a groove 51 is provided in plate 4, from the channels 38 to permit liquid F to reach the intake side of the gears 19 and 20.

When the rotor housing A is stationary and rotary motion is transmitted through the gear train P, liquid F, see Fig. 3, lies in the rotor housing A, and in housing G, up to the level governed by the holes 76, see Fig. 2. The liquid will be forced by the sun gear 17 into the conduit path M in a circular swirl, in the clockwise direction, as shown in Fig. 3. Near the planet gear 18 at the zone indicated by 99, the conduit path is restricted to the size of the undercut 98, and the planet gear 18 at these zones moving counter-clockwise, moves the liquid F back into zone 99, causing the liquid F to accumulate at the zone 99 for supplying the inlet holes 39. This action decreases as the rotor housing A starts to rotate, causing the liquid F, by centrifugal force, to fill the channels 97 up to the depth permitted by the depending wall 96, see Figs. 4 and 5, and completely cover the inlet holes 39 and causing pressure therein and helping the one-way valve D to restrict liquid escaping from pressure chamber 44.

In the foregoing I have described my invention as using liquid. In various embodiments of my invention, for use with various types of machines and under various conditions, other fluids may be preferable. For example, high speed units may require a gas, such as, for example, air, having the characteristic of being compressible, and hence requiring a higher number of revolutions of the gear train P before the proper compression is formed in pressure chamber 44 to retard the rotation of the planet gears 19. Liquid may be preferable in low speed units, in which the change-over to direct drive is required in a smaller number of revolutions of the sun gear 20.

In Figs. 15 to 17, inclusive, is another embodiment of my invention similar to the embodiment described but different in respect to the valve arrangement E, which is in this case constructed so as to permit the rotor housing to be hermetically sealed and self contained.

The rotor housing A', is completely closed, and preferably hermetically sealed; and the liquid F is confined to the rotor housing A'; and liquid F has a complete conduit path for free circulation and a conduit path for dynamic balance therein as described for the first form; hence the vertical walls of the rotor housing section 2 and center plate 4 will be without any openings such as 80 Figs. 2 and 3. Threaded plugs 135, see Fig. 15, tapped into vertical wall of rotor housing section 2 provide for adding liquid F, and these plugs 135 may be vented if air is used as the fluid.

The valve consists of a cylindrical valve body 136 having a definite mass, fitted into a cylindrical chamber 137 in rotor housing A', lying longitudinally on an axis preferably radial from the axis of the rotor housing A'. The valve body 136 has an annular beveled edge 138 on its outer end, forming a valve head, to co-act with a valve seat 139 in the upper end of chamber 137. The valve seat is retained in place by a pin 140, and a threaded cap 141 closes the outer end of the chamber 137 in the rotor housing A'. An orifice 142 in the valve seat 139 communicates with a passage 143 leading to pressure chamber 44. An outlet orifice 48, see Fig. 16, in the plate 4, leads from the chamber 137. The valve construction 138—139 is interposed between the orifices 142 and 48, to control the rate of liquid F flowing therethrough.

A spring 144 abutting the valve body 136 and the cap 141 with an initial tension thereon, retains the valve body 136 in a position to permit free flow of liquid F through orifices 142 and 48. This forms a definite mass, to be acted upon by the centrifugal force of the rotation of the rotor housing A', and to be urged radially downward in the chamber 137 by the pressure caused by the pumping action of the rotating gears 19—20.

The action is substantially the same as that of the first described embodiment. Pressure in chambers 44 and 137 tends to move the valve body 136 in the inward direction to cause a flow of liquid F and is opposed by centrifugal force on the mass of the valve body 136 tending to move it outwardly. The valve E' is thereby caused to take up a position corresponding to the torque on the drive shaft 16 and speed of the rotor housing A', to drive the load on the driven shaft 15, the valve restricting the flow of liquid F, to cause a pressure in chamber 44, to retard the gears 19, 20 to cause the gear reduction ratio to decrease, as the torque overcomes the load.

Embodiments of my invention may be used with any form of differential gearing, and in instances where the form of differential gearing has the rotor housing rotating initially at the predetermined gear reduction ratio, the plug 49 may be dispensed with since centrifugal force would act immediately on the weight 62 or mass of valve body 136.

My invention as described hereinbefore may be applied to various uses. For example, it may be used as a speed changing transmission between the motor and the propeller shaft of an automobile. In this instance, the gear reduction ratio through the differential gears would be such as to correspond to the gear reduction ratio of the usual gear shift transmission at low speed. In this use of my invention when the throttle is opened causing the motor to run above a predetermined idling speed, the propeller shaft is rotatably driven at a predetermined gear reduction ratio; and the vehicle will be started and brought up to travel at a rate governed by this predetermined gear ratio; and as the vehicle inertia is overcome more and more, the predetermined gear ratio will be gradually and automatically reduced; and finally the vehicle will be driven directly without gear reduction.

Conversely the transmission ratio will automatically and gradually be changed to a gear reduction ratio in the event that the vehicle load becomes greater as when climbing a hill.

Again, the transmission above described may be utilized to perform the function of a clutch between any driven element and driving element, to start the driven element from rest and bring it up to speed without shock, particularly when the load being driven has considerable inertia.

Again, the transmission above described may be utilized to perform the function of a brake to slow down a load being driven.

Again, the transmission above described may be utilized to perform the function of an overdrive to cause the speed of an element to be increased from that of a direct drive to that of an increased gear ratio.

In numerous respects, as will be apparent, my invention is not limited to the exact details of construction illustrated and described. Changes and modifications may be made, without departing from the spirit of my invention and without sacrificing its advantages, and my invention is comprehensive of all such modifications and changes which come within the scope of the appended claims.

I claim:

1. In a power transmission, a driving and a driven rotary shaft, interconnected through a differential gearing mechanism comprising rotatable meshed gears, means to control the rotary direction of the differential gearing mechanism responsive to a predetermined velocity of the drive shaft, to cause the driving shaft to drive the driven shaft by the gears at a predetermined gear ratio, fluid disposed to be pumped by meshed teeth of gears of the differential mechanism to thereby exert a pump load braking action on the pumping gears, and means to variably control the rate of pumped fluid flow to variably control the pump load action, to variably control the ratio of transmission, said variable control means operable responsive to a relation of torque transmitted.

2. In a power transmission, a driving and a driven shaft, interconnected through a differential gearing mechanism comprising rotatable meshed gears, means to variably brake the rotary motion of the differential gearing in a direction to cause the driving shaft to drive the driven shaft by the gears at a predetermined gear ratio, said means operable responsive to a predetermined velocity of the driving shaft, a fluid pumping mechanism co-acting with said differential gearing mechanism, fluid disposed to be pumped therein to exert a pump load braking action on the co-acting pumping mechanism and means to variably control the pumping load action, to variably control the rate of transmission, said variable control means operable responsive to a relation of torque and velocity transmitted.

3. In a power transmission, a driving and a driven rotary shaft, interconnected through a differential gearing comprising rotatable meshed gears, means to variably brake the rotary motion of the differential gearing in a direction to cause the driving shaft to drive the driven shaft by the gears at a predetermined gear ratio, fluid disposed to be pumped by meshed teeth of gears of the differential mechanism to thereby exert a pumped load braking action on the pumping gears and means to variably control the rate of pumped fluid flow to variably control the pump load action, to variably control the rate of transmission, said variable control means operable responsive to a relation of the fluid pressure relative to the torque difference of the driving and driven shafts and a centrifugal force relative to the velocity transmitted.

4. In a power transmission, a driving and a driven shaft, interconnected through a differential gearing comprising rotatable meshed gears, means to variably brake the rotary motion of the differential gearing in a direction to cause the driving shaft to drive the driven shaft by the gears at a predetermined gear ratio, said means operable responsive to a predetermined velocity of the driving shaft, fluid disposed to be pumped by meshed teeth of gears of the differential mechanism to thereby exert a pumped load braking action on the pumping gears and means to variably control the pumped fluid to variably control the pump load action, to variably control the rate of transmission, said variable control means operable responsive to a relation of torque and velocity transmitted.

5. In a power transmission, a driving and a driven rotary shaft, interconnected through a differential gearing comprising rotatable meshed gears, means to variably brake the rotary motion of the differential gearing in a direction to cause the driving shaft to drive the driven shaft by the gears at a predetermined gear ratio, said means operable responsive to a predetermined velocity of the driving shaft, fluid disposed to be pumped by the meshed teeth of the gears of the differential mechanism to thereby exert a pumped load braking action on the pumping gears and means to variably control the rate of pumped fluid to variably control the pump load action, to variably control the rate of transmission, said second means comprising a valve mechanism operably affected by a relation of pumped fluid pressure commensurable to the torque-difference of the driving and driven shafts.

6. In a power transmission, a driving and driven rotary shaft, interconnected through a differential gearing comprising rotatable meshed gears, a fluid pumping mechanism coacting with said differential gearing, fluid disposed in said pumping mechanism, means to throttle the fluid responsive to a predetermined velocity of the fluid pumped, to progressively cause a brake load action of the differential gearing in a direction of rotation to cause the driving shaft to drive the driven shaft by the gears at a predetermined gear reduction ratio, fluid disposed to be pumped by meshed teeth of gears of the differential gearing to thereby exert a pumped load braking action on the pumping gears, means to variably throttle the rate of pumped fluid flow to variably change the pump load braking action to variably change the ratio of transmission, said throttling means comprising valve means operably responsive to a relation of torque and velocity transmitted.

7. In a power transmission, a driving and a driven shaft, interconnected through a differential gearing comprising rotatably meshed gears, a rotor housing enclosing said gears, a second gearing comprising a gear and an idler pinion, the gear being rotatable with the rotor housing and meshed with the idler pinion, fluid disposed to be pumped by meshed teeth of the second gearing to thereby exert a pumped load braking action on the pumping gears, means to variably throttle the fluid responsive to the predetermined velocity of fluid pumped, to variably retard the rotation of the rotor housing in a direction to variably cause the driving shaft to drive the driven shaft by the differential gears at a predetermined gear reduction ratio, fluid disposed to be pumped by meshed teeth of the differential gearing to thereby exert a pumped load braking action on the pumping gears of the differential gearing, means to variably throttle the rate of pumped fluid flow to variably change the pump load braking action, to variably change the rate of transmission, said second throttling means comprising valve means operable responsive to a relation of torque and velocity transmitted.

8. In a power transmission, a power drive shaft and a driven shaft interconnected through a differential gearing comprising a rotary housing rotatably supporting pinions and rotatable gears meshed with pinions, a fluid pumping mechanism co-acting with said rotary housing, fluid disposed in said pumping mechanism, means to variably control the fluid flow comprising a valve in the path of the fluid to restrict the fluid flow at a predetermined fluid pressure and movable by the fluid pressure to further restrict the fluid flow and a dash-pot on said valve to govern the rate of restriction to progressively retard the pumping mechanism, to progressively retard the rotary housing, to progressively cause the driving shaft to drive the driven shaft by the gears and pinions at a predetermined gear ratio.

9. In a power transmission, a power drive shaft and a driven shaft interconnected through a differential gearing comprising a rotary housing rotatably supporting pinions and rotatable gears meshed with pinions, a fluid pumping mechanism coacting with said rotary housing, fluid disposed in said pumping mechanism, means to variably control the fluid flow responsive to a predetermined fluid pressure relative to the velocity of the driving shaft and thereafter control the rate of fluid flow to progressively retard the pumped fluid and correspondingly retard the pumping mechanism, to progressively retard the rotary housing, to progressively cause the driving shaft to drive the driven shaft by the gears and pinions at a predetermined gear ratio.

10. In a power transmission, a power drive shaft and a driven shaft interconnected through a differential gearing comprising a rotary housing supporting pinions and rotatable gears meshed with pinions, a fluid pumping mechanism co-acting with said rotary housing, means providing an orifice, a quantity of fluid disposed to be pumped by the pumping mechanism through the orifice at pressure commensurable with the pumping mechanism velocity, means operating responsive to a predetermined fluid pressure to progressively retard the pumped fluid to correspondingly brake the rotation of the rotary housing at a predetermined rate, to progressively cause the driving shaft to drive the driven shaft by the gears at a predetermined gear ratio.

11. In a power transmission, a power drive shaft and a driven shaft, interconnected through a differential gearing comprising a rotary housing rotatably supporting pinions and rotatable gears meshed with pinions, a second gearing comprising a gear and an idler pinion, the gear being rotatable with the rotary housing and meshed with the idler pinion, means providing an orifice, a quantity of fluid disposed to be pumped by the rotating gear and idler pinion through the orifice, at pressure commensurable with the gear and idler pinion rotary velocity, means operating responsive to a predetermined fluid pressure to progressively retard the pumped fluid and to correspondingly brake the rotation of the pinion to progressively cause the driving shaft to drive the driven shaft by the gears at a predetermined gear ratio.

12. In a power transmission, a driving and a driven rotary shaft, interconnected through a differential gearing mechanism comprising a one-way brake and rotatable meshed gears, to cause the driving shaft to drive the driven shaft at a predetermined gear ratio, a fluid disposed to be pumped by meshed teeth of the gears of the differential mechanism to thereby exert a pump load braking action on the pumping gears and means to variably control the rate of pumped fluid flow to variably control the pump load braking action to variably control the ratio of transmission, said means being operable responsive to a relation of torque and velocity transmitted.

13. In a differential power transmission a pair of differential gears, pinions meshed with the gears, a drive shaft connected to one gear, a driven shaft connected to the other, a one-way brake provided whereby power is transmitted from one shaft to the other at a predetermined gear reduction ratio effected by relative rotation of the gears and pinions, a pumping mechanism co-acting with said pinions, a fluid conduit path containing fluid disposed to be pumped therethrough by the pumping mechanism, means to progressively increase the fluid pressure at the pumping mechanism, to progressively brake rotation of the pinions to thereby progressively reduce the degree of gear reduction of the transmission, said means operable responsive to a relation of the torque-difference of the drive and driven rotary shafts.

14. In a power transmission, a driving and a driven rotary shaft, interconnected through a differential gearing mechanism comprising a one-way brake and rotatable meshed gears, to cause the driving shaft to drive the driven shaft at a predetermined gear ratio, a fluid disposed to be pumped by meshed teeth of the gears of the differential mechanism to thereby exert a pump load braking action on the pumping gears and means to variably control the rate of pumped fluid flow to variably control the pump load braking action to variably control the ratio of transmission, said means being operable responsive to a relation of fluid pressure commensurable to the torque-difference of the driving and driven rotary shafts.

15. In a power transmission, a power drive shaft and a driven shaft interconnected through a differential gearing mechanism comprising a one-way brake to cause the drive shaft to drive the driven shaft by the gears through the differential gearing mechanism at a predetermined ratio, a fluid disposed in a fluid circuit including two intermeshed gears to exert a pumped load braking action on the gears comparable to the torque-difference of the drive and driven shafts and means provided to control the pumped fluid to variably control the differential gearing mechanism to variably control the rate of transmission.

16. In a power transmission, a driving and a driven rotary shaft, interconnected through a differential gearing mechanism comprising a one-way brake and rotatable meshed gears, to cause the driving shaft to drive the driven shaft at a predetermined gear ratio, a fluid disposed to be pumped by meshed teeth of the gears of the differential mechanism to thereby exert a pump load braking action on the pumping gears and means to variably control the rate of pumped fluid flow to variably control the pump load action to variably control the ratio of transmission, said means being operable responsive to a relation of torque difference of the driving and driven shafts and velocity transmitted.

17. In a power transmission, a driving and a driven rotary shaft, interconnected through a differential gearing mechanism comprising a one-way brake and rotatable meshed gears, to cause the driving shaft to drive the driven shaft at a predetermined gear ratio, a fluid disposed to be pumped by meshed teeth of the gears of the differential mechanism to thereby exert a pump load braking action on the pumping gears and means to variably control the rate of pumped fluid flow to variably control the pump load action to variably control the ratio of transmission, said means being operable responsive to a relation of the fluid pressure relative to the torque difference of the driving and driven shafts and a centrifugal force relative to velocity transmitted.

18. In a power transmission, a driving and a driven rotary shaft, interconnected at a predetermined gear ratio through a differential gearing mechanism comprising a one-way brake and rotatable meshed gear and pinions, a quantity of fluid to be pumped under pressure by rotation of the meshed gear and pinions and movable means responsive to a balance of predetermined pumped fluid pressure and centrifugal force of the velocity transmitted for progressively controlling the flow of pumping fluid to progressively increase the fluid pressure, to progressively brake the rotation of the pinions.

19. In a differential power transmission, a differential gearing mechanism including a drive shaft, a first differential gear driven thereby, a second differential gear and a driven shaft driven thereby, pinions meshed with both gears, a brake on an element of the differential mechanism to prevent its rotation in one direction whereby the drive shaft may drive the driven shaft by the gears at a predetermined gear reduction ratio, fluid disposed to be pumped by the teeth of the gear and pinion meshed engagement, at pressure commensurable with the speed of the driven shaft, to thereby exert a pump load braking action on the pumping pinions, means for throttling the flow of pumped fluid to increase the pump load to retard rotation of the pinions and change the ratio of transmission, said means comprising valve means operably affected by a relation of decreasing fluid pressure commensurable to the decreasing torque difference of the driving and driven shafts and increasing centrifugal force commensurable to the increasing velocity transmitted.

20. In a differential power transmission, a differential gearing mechanism including a drive shaft, a first differential gear driven thereby, a second differential gear and a driven shaft driven thereby, pinions meshed with both gears, a brake on an element of the differential mechanism to prevent its rotation in one direction whereby the drive shaft may drive the driven shaft by the gears at a predetermined gear reduction ratio, fluid disposed to be pumped by the teeth of the gear and pinion meshed engagement, at pressure commensurable with the speed of the driven shaft, to thereby exert a pump load braking action on the pumping pinions, means for controlling the flow of pumped fluid to increase the pump load to retard rotation of the pinions and change the ratio of transmission, said means comprising valve means operable by relation of fluid pressure commensurable to the torque transmitted.

21. In a differential power transmission, a differential gearing mechanism including a drive shaft, a first differential gear driven thereby, a second differential gear and a driven shaft driven thereby, pinions meshed with both gears, a brake on an element of the differential mechanism to prevent its rotation in one direction whereby the drive shaft may drive the driven shaft by the gears at a predetermined ratio, fluid disposed to be pumped by the teeth of the gear and pinion meshed engagement, at pressure commensurable with the speed of the driven shaft, to thereby exert a pump load braking action on the pumping pinions, means for controlling the flow of pumped fluid to increase the pump load to retard rotation of the pinions and change the ratio of transmission, said means comprising valve means operably started by a predetermined fluid pressure commensurable with rotating gears, and thereafter operably affected by a relation of fluid pressure commensurable with the transmitted torque and a centrifugal force commensurable with the transmitted velocity.

22. In a differential power transmission, a differential gearing mechanism including a pair of differential gears, pinions meshed with the gears, a drive shaft connected to one gear, a driven shaft connected to the other gear, a brake on an element of the differential mechanism to prevent its rotation in one direction whereby power is transmitted from one shaft to the other at a predetermined gear reduction ratio effected by relative rotation of the gears and pinions, a fluid conduit path containing fluid disposed to be pumped therethrough by rotation of the gear and pinions, a valve for controlling the flow, means to progressively close the valve operable by pumped fluid in counter relation to centrifugal force affecting the mass of said means, to progressively increase the fluid pressure at the gear and pinions, to progressively brake rotation of the pinions to thereby progressively reduce the degree of gear reduction of the transmission.

23. In a power transmission, a power drive shaft, a driven shaft, a differential gearing mechanism comprising a one-way brake, relatively rotatable pinions, for transmitting drive shaft power to the driven shaft at a predetermined gear ratio of transmission effected by relative rotation of the pinions, means providing an orifice, a quantity of fluid disposed to be pumped by the rotating pinions through the orifice, at pressure commensurable with the pinion rotary velocity said orifice restricting the fluid flow at a predetermined fluid pressure to progressively retard the pumped fluid and correspondingly initiating braked rotation of the pinions, and means to further progressively brake rotation of the pinions responsive to fluid pressure in counter relation to centrifugal force on the said means.

24. In a differential power transmission, a differential gearing mechanism including a drive shaft, a first differential gear driven thereby, a second differential gear and a driven shaft driven thereby, a pinion meshed with both gears, a brake on an element of the differential mechanism to prevent its rotation in one direction whereby the drive shaft may drive the driven shaft by the gears at a predetermined gear reduction ratio, fluid disposed to be pumped by meshed teeth of the gear and pinions at pressure commensurable with the speed of the driven shaft, to thereby exert a pump load braking action on the pumping pinions, means for controlling the flow of pumped fluid to increase the pump load to retard rotation of the pinions and to change the ratio of transmission, said controlling means comprising valve means operable commensurably with a predetermined pressure, and thereafter operable responsive to variable fluid pressure in counter relation to variable centrifugal force on said means commensurable with the velocity transmitted.

25. In a differential power transmission, a differential gearing mechanism including a drive shaft, a first differential gear driven thereby, a second differential gear and a driven shaft driven thereby, pinions meshed with both gears, a brake on an element of the differential mechanism to prevent its rotation in one direction whereby the drive shaft may drive the driven shaft by the gears at a predetermined gear reduction ratio, fluid disposed to be pumped by meshed teeth of the gear and pinions at pressure commensurable with the speed of the driven shaft to thereby exert a pump load braking action on the pumping pinions, means for controlling the flow of pumped fluid to increase the pump load to retard rotation of the pinions and to change the ratio of transmission, said throttling means comprising valve means operable commensurably with a predetermined pressure, and thereafter operable responsive to variable fluid pressure acting upon the valve means to permit flow of fluid, and a variable centrifugal force acting on the mass of the valve means to retard flow of fluid.

HARRY ORNER.